United States Patent
Sawada et al.

[11] Patent Number: 5,247,062
[45] Date of Patent: Sep. 21, 1993

[54] HETERO-AROMATIC POLYMER CONTAINING FLUOROALKYL GROUP

[75] Inventors: Hideo Sawada, Tsukuba; Masaharu Nakayama, Tsuchiura, both of Japan

[73] Assignee: Nippon Oil and Fats Cp., Ltd., Tokyo, Japan

[21] Appl. No.: 884,852

[22] Filed: May 13, 1992

Related U.S. Application Data

[63] Continuation of Ser. No. 582,178, Sep. 24, 1990, abandoned.

[30] Foreign Application Priority Data

Jan. 31, 1989 [JP] Japan ................................. 1-19872

[51] Int. Cl.⁵ .............................................. C08G 75/00
[52] U.S. Cl. ..................................... 528/377; 252/500
[58] Field of Search ...................... 528/377, 380, 401

[56] References Cited

U.S. PATENT DOCUMENTS 4,711,742 12/1987 Jen .................................... 252/500

Primary Examiner—Christopher Henderson
Attorney, Agent, or Firm—Darby & Darby

[57] ABSTRACT

A hetero-aromatic polymer containing a fluoroalkyl group is a novel polymer and has a polymerization degree of 5 to 5000, the polymer including the following structural unit represented by the general formula (I) of:

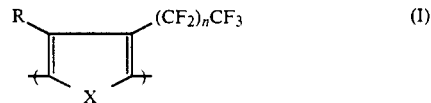

(wherein R stands for a hydrogen atom or an alkyl group having 1 to 25 carbon atoms, X stands for a sulfur atom, an imino or an oxygen atom, and n is an integer of from 1 to 9.)

2 Claims, No Drawings

HETERO-AROMATIC POLYMER CONTAINING FLUOROALKYL GROUP

This is a continuation of application Ser. No. 07/582,178, filed Sep. 24, 1990, now abandoned.

TECHNICAL FIELD

The present invention relates to a novel hetero-aromatic polymer containing a fluoroalkyl group.

BACKGROUND TECHNOLOGY

Hetero-aromatic polymers, representatives being polythiophene and polypyrrole, have hitherto drawn public attention as electrically conductive polymers. However, the aforementioned electrically conductive polymers have disadvantages that they are insoluble in any solvents and are not melted by heating to result in extremely poor workability. As a trial for compensating such disadvantages, it has been proposed to introduce hydrocarbon alkyl groups at a position 3 or 4 of a thiophene ring of the polythiophene. (See "Chemistry and Chemical Industry", vol. 41, page 1022 (1988).) It is reported that the polymer containing an alkyl group in the thiophene ring is dissolved in certain solvents and can be melted by heating at a relatively low temperature.

On the other hand, in recent years, organic compounds in which fluoroalkyl groups are introduced draw public attention as the compounds having resistance to chemicals and water- and oil-repellent functions. However, hetero-aromatic polymers, representatives being polythiophene, polypyrrole and polyfuran, in which fluoroalkyl groups are introduced have not yet been known at the present day.

An object of this invention is to provide a novel hetero-aromatic polymer containing a fluoroalkyl group, which has characteristics inherent to the fluoroalkyl groups, i.e. resistance to chemicals and water- and oil-repellent properties, and may be used as an electrically conductive polymer material.

DISCLOSURE OF THE INVENTION

According to the present invention, there is provided a hetero-aromatic polymer containing a fluoroalkyl group and having a polymerization degree of 5 to 5000, the polymer including the following structural unit represented by the general formula (I) of:

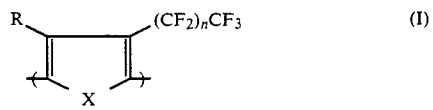

(wherein R stands for a hydrogen atom or an alkyl group having 1 to 25 carbon atoms, X stands for a sulfur atom, an imino or an oxygen atom, and n is an integer of from 1 to 9.)

BEST EMBODIMENT FOR THE PRACTICE OF THE INVENTION

The present invention will be described more in detail hereinbelow.

The structural unit of the hetero-aromatic polymer containing a fluoroalkyl group, according to this invention, can be represented by the following general formula (I) of:

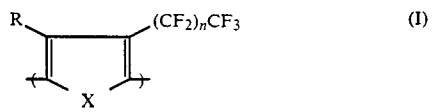

In the formula, R stands for a hydrogen atom or an alkyl group having 1 to 25 carbon atoms and X stands for a sulfur atom, an imino or an oxygen atom. Meanwhile, n is an integer of from 1 to 9. It is difficult to produce a polymer in which R has not less than 26 carbon atoms and/or n is not less than 10. Preferable examples of the structural unit of the hetero-aromatic polymer represented by the aforementioned formula (I) include structural units derived from 3-perfluoropropylthiophene, 3-perfluoropropyl-4-ethylthiophene, 3-perfluoropropylpyrrole, 3-perfluoropropylfuran, 3-perfluoroheptylthiophene, 3-perfluoroheptylpyrrole, 3-perfluoroheptylfuran, 3-perfluoropropyl-4-ethylthiophene, 3-perfluoropropyl-4-dodecylthiophene, 3-perfluoropropyl-4-octylthiophene, 3-perfluoropropyl-4-docosylthiophene, 3-perfluoroheptyl-4-octylthiophene, 3-perfluoroheptyl-4-octylpyrrole, and 3-perfluoroheptyl-4-octylfuran.

The hetero-aromatic polymers containing a fluoroalkyl group, according to the invention, may be produced through Grignard reaction, in the presence of a nickel catalyst, using for example a monomer in which the positions 2 and 5 of the thiophene ring, pyrrole ring or furan ring of the aforementioned structural unit are substituted by halogens, as represented by the following formula of:

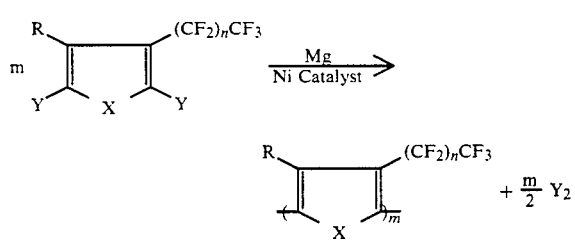

(In the formula, R, X and n each stand for the same as in the aforementioned general formula (I), and Y stands for a halogen atom. Meanwhile, m is an integer of from 5 to 5000.)

Otherwise, they may be synthesized from monomers each having a structure same as that of the aforementioned structural unit through polymerization reactions in the presence of a ferric chloride catalyst, as represented by the following formula of:

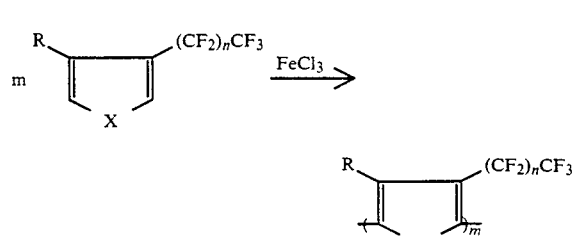

(In the formula, R, X, n and m are the same as defined respectively for R, X, n and m in the reaction formula for the Grignard reaction.)

In case where the aforementioned Grignard reaction is utilized, it is desirable that the monomer is heated preferably to 0° to 150° C. to react the same for 1 to 70 hours; and in case where the ferric chloride catalyst is used, it is preferred that the monomer be reacted preferably at −10° to 100° C. for 1 to 50 hours.

The hetero-aromatic polymer having a fluoroalkyl group of the invention has a polymerization degree ranging within 5 to 5000. If the polymerization degree is less than 5, the resultant product is a liquid which does not have the desired properties; and if the polymerization degree is more than 5000, the resultant product has poor solubility in solvents to make it difficult to use the same.

The hetero-aromatic polymer containing a fluoroalkyl group, according to this invention, is easily soluble in general organic solvents such as chloroform, methylene chloride, benzene, tetrahydrofuran and toluene.

As will be appreciated from the foregoing, the hetero-aromatic ring of the fluoroalkyl group-containing hetero-aromatic polymer of the invention is substituted by a fluoroalkyl group which binds directly to the ring through chemical bond, so that the water- and oil-repellent effects and the effect of resisting chemicals, these effects being attributable to the inclusion of the fluoroalkyl group, are durable almost permanently. Furthermore, since it is soluble in a wide variety of organic solvents, it is improved in workability to be used as a functional material and as an electrically conductive material.

EXAMPLES

The present invention will be described more in detail hereinbelow with reference to Examples thereof and a Reference Example, the invention being not restricted thereby.

REFERENCE EXAMPLE 8.8g (0.04 mol) of 2,5-dibromothiophene was added to 200 g of a 1,1,2-trichlorotrifluoroethane solution containing 12.8 g (0.03 mol) of bis(perfluorobutylyl) peroxide to react at 40° C. for 5 hours. After the reaction, 2,5-dibromo-3-perfluoropropylthiophene was washed with water, washed with a 5% aqueous solution of sodium hydroxide and further washed with water, dried over magnesium sulfate, and then isolated by distillation under reduced pressure. The yield of the obtained 2,5-dibromo-3-perfluoropropylthiophene was 5.3 g.

EXAMPLE 1

4.3 g of 2,5-dibromo-3-perfluoropropylthiophene obtained by Reference Example 1 and 0.26 g of magnesium were added to 15 g of tetrahydrofuran and heated to prepare a Grignard reagent, and then 0.005 g of nickel chloride ($NiCl_2$) was added and subjected to reflux at about 70° C. for 10 hours. After the reflux, washing with 300 ml of hydrochloric methanol was effected, and further effected were washing with methanol and water repeatedly for two times for each. Upon subsequent drying in vacuum, 0.83 g of a polymer was obtained. The obtained polymer was dissolved in tetrahydrofuran, and the molecular weight thereof (based on polystyrene) was determined by Gel Permeation Chromatography (GPC) to find that M=7775 and $M_w/M=1.85$. An infrared absorption spectrum and a nuclear magnetic resonance spectrum of the obtained polymer were determined. The results are shown below.

IR($cm^{-1}$) 1340 ($CF_3$), 1230 ($CF_2$)

Meanwhile, although determination by $^{19}F$-NMR was conducted, no peak attributable to fluorine was found. It is believed that no nuclear magnetic resonance phenomenon takes place due to the fact that the obtained polymer is an electrically conductive high polymer.

EXAMPLE 2

Generally following Example 1 except that 2,5-dibromo-3-perfluoropropylthiophene was replaced by 2,5-dibromo-3-perfluoroheptylthiophene, a polymer was synthesized and the yield, molecular weight and infrared absorption spectrum of the obtained polymer were determined similarly to Example 1. The results are shown below.

Yield: 0.90 g.
M=9860, $M_w/M=1.98$.
IR ($cm^{-1}$) 1355 ($CF_3$), 1225 ($CF_2$).

EXAMPLE 3

Generally following Example 1 except that 2,5-dibromo-3-perfluoropropylthiophene was replaced by 2,5-dibromo-3-perfluoropropyl-4-ethylthiophene, a polymer was synthesized and the yield, molecular weight and infrared absorption spectrum of the obtained polymer were determined similarly to Example 1. The results are shown below.

Yield: 0.60 g.
M=12100, $M_w/M=2.10$.
IR ($cm^{-1}$) 1345 ($CF_3$), 1230 ($CF_2$).

EXAMPLE 4

Into chloroform (1 l) displaced by nitrogen, added were 4.0 g of 3-perfluoroheptylpyrrole and 108 g of ferric chloride to react at room temperature for 15 hours. After the reaction, a product was precipitated in methanol, filtered, washed with methanol and water, and then dried in vacuum to obtain 2.5 g of a polymer. The results of determination of the molecular weight and infrared absorption spectrum are shown below.

M=23600 $M_w/M=4.81$.
IR ($cm^{-1}$) 3270 (NH), 1330 ($CF_3$), 1230 ($CF_2$).

EXAMPLE 5

Generally following Example 4 except that 3-perfluoroheptylpyrrole was replaced by 3-perfluoroheptylfuran, a polymer was synthesized and the obtained polymer was analyzed similarly to Example 1. The results are shown below.

Yield: 1.9 g.
M=19650, $M_w/M=5.90$.
IR ($cm^{-1}$) 1350 ($CF_3$), 1225 ($CF_2$).

We claim:

1. A hetero-aromatic polymer containing a fluoroalkyl group and having a polymerization degree of 5 to 5000, the polymer including the following structural unit represented by the general formula (I) of:

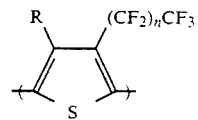

(wherein R stands for a hydrogen atom or an alkyl group having 1 to 25 carbon atoms, and n is an integer of from 2 to 9.)

2. The hetero-aromatic polymer containing a fluoroalkyl group according to claim 1, wherein the structural unit of the hetero-aromatic polymer represented by said general formula (I) is selected from the group consisting of 3-perfluoropropylthiophene, 3-perfluoropropyl-4-ethylthiophene, 3-perfluoroheptylthiophene, 3-perfluoropropyl-4-dodecylthiophene, 3-perfluoropropyl-4-octylthiophene, 3-perfluoropropyl-4-docosylthiophene, 3-perfluoroheptyl-4-octylthiophene and mixtures thereof.

* * * * *